March 10, 1936.         A. M. MacFARLAND         2,033,722
STEEL SHAFT FOR GOLF CLUBS
Filed Dec. 17, 1931
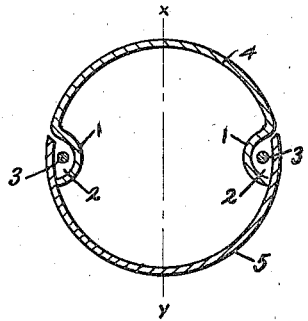
Fig. 1
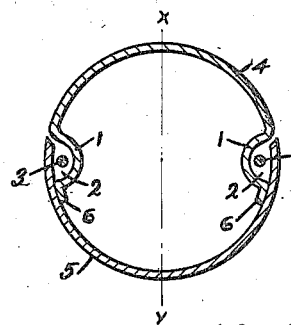
Fig. 2
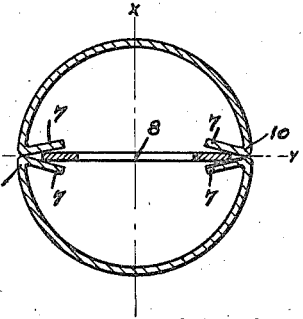
Fig. 3
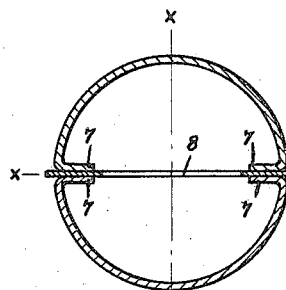
Fig. 4
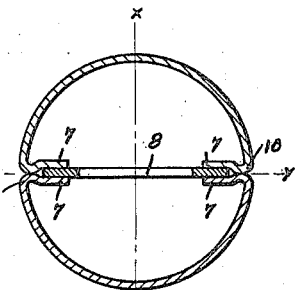
Fig. 5
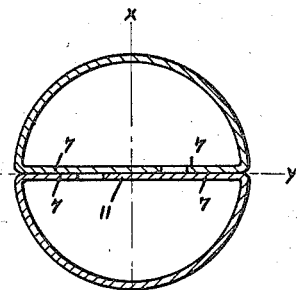
Fig. 6
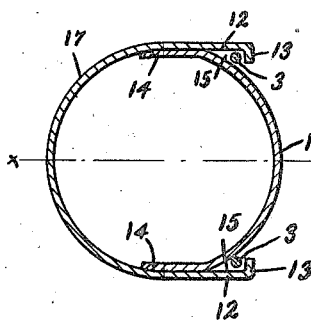
Fig. 7
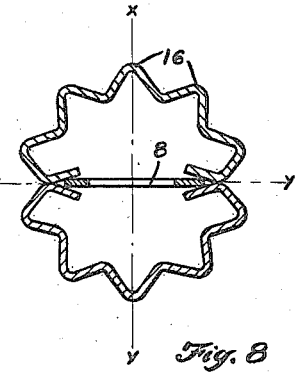
Fig. 8
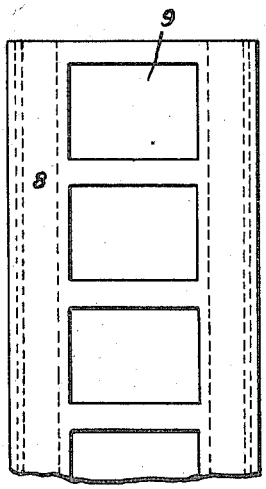
Fig. 10
Fig. 9
INVENTOR.
Allis M. MacFarland
BY
Ray O'berlin & Ray
ATTORNEYS.

Patented Mar. 10, 1936

2,033,722

UNITED STATES PATENT OFFICE 2,033,722

STEEL SHAFT FOR GOLF CLUBS

Allis M. MacFarland, Youngstown, Ohio, assignor to The Youngstown Welding & Engineering Co., Youngstown, Ohio, a corporation of Ohio Application December 17, 1931, Serial No. 581,591

4 Claims. (Cl. 273—80)

My invention relates to shafts for golf clubs of the type made from thin metal, preferably steel. Clubs of this type have been made for a number of years, but prior to my invention, the best shafts of thin metal have been those made from seamless steel tubing, which shafts, however, are of relatively expensive production. Shafts which have been formed of sheet metal have been made heretofore by shaping a sheet to the form desired and by brazing the meeting edges to form a closed seam. Clubs with shafts made in this manner have proven satisfactory in use, being superior to clubs with shafts of wood.

I have found that shafts made according to my invention are equal in performance to those made of seamless tubing and can be made at much less cost. To secure the balance of weight and rigidity, and the balanced elasticity needed in such a shaft, I so form my shaft that in respect to these characteristics, the function of each element on one side of the plane defined by the swing of the shaft in use is balanced by functions of elements of the shaft on the other side of said plane. The manner in which I secure this highly desirable result will appear from the following description of my shaft and method of making same.

In said annexed drawing:

Fig. 1 is a cross-sectional view before brazing of a shaft formed with reenforcing beads; Fig. 2 is a cross-sectional view before brazing of a shaft formed with reenforcing beads and reenforcing extended margins; Fig. 3 is a cross-sectional view before brazing of a shaft with reenforcing fins which have been flared at an angle; Fig. 4 is a cross-sectional view before brazing of a shaft with reenforcing fins which have not been flared; and Fig. 5 is a cross-sectional view before brazing of a shaft with reenforcing fins which have been flared and bent back to parallelism; Fig. 6 is a cross-sectional view of a shaft with reenforcing fins so extended as to overlap and form a cross-member; Fig. 7 is a cross-sectional view before brazing of a shaft with reenforcing members flat on the walls adjacent the seams; Fig. 8 is a cross-sectional view before brazing of a shaft with longitudinal corrugations; Fig. 9 is a view of a half shaft before forming to a curved shape, showing the beads therein; and Fig. 10 is a view of a perforated strip of brazing material used in brazing shafts shown in Figs. 3, 4, 5, 6 and 8.

A cross-section of a preferred form of my balanced shaft is shown in Fig. 1. In making my shaft in this manner I cut thin sheet steel to shape and size which will produce, when pressed, slightly more than half a split shaft 4. I form a narrow bead 1 along each edge of this piece, as shown in Figs. 1, 2 and 9. A similar piece of sheet metal, but slightly more narrow is pressed to form the other half of the shaft 5. The two pressed pieces are then fitted together with the beaded portions of one piece in lapped relation with the edges of the other, as shown in Figs. 1 and 2. In the long channels or pockets 2, Figs. 1 and 2, formed by the beads, I place a brazing material 3, preferably in the form of wire. It will be noted that the beads which constitute reenforcing elements in the finished shaft are adapted to hold brazing material in the position where it is to be used in the making of the shaft. With twists of wire, or by other means, I hold the two halves in fixed relation and insert in a brazing furnace until the bronze wire or other brazing element flows, uniting the two halves. It will be observed that further reenforcement is secured when the marginal material is extended beyond the bead, as shown at 6 in Fig. 2.

A variation of my balanced shaft is shown in Figs. 3, 4, 5 and 6. In this form I turn the marginal portions of each half inward to form radial fins 7 and place the two halves together with brazing materials 8, such as thin sheet bronze, between the contacting fins. Preferably the bronze sheet should have large perforations 9, as shown in Fig. 10, that there may be no excess of bronze left in brazing. To insure a steel-to-steel contact at the seams, the fins may be flared as shown at 10 in Fig. 3, or 10 in Fig. 5. Likewise it is optional to extend the fins so as to make when welded, a continuous reenforcing member across the shaft, as shown in Fig. 6 at 11.

Another embodiment of my invention is shown in Fig. 7. In this form I cut sheet steel to a size materially wider than needed to form a half shaft 17 when pressed. This excess metal forms two tangential portions, as shown at 12 in Fig. 7. The extreme edge 13 of each such portion is bent sharply inward. The sheet metal from which the other half of the shaft 18 is formed is also cut with extra width. This excess portion 14, Fig. 7, along each edge is flattened and bent slightly inward when the metal is pressed to form half a shaft. This half is then inserted within the half first formed and in the pocket or channel 15, Fig. 7, formed by the sharply inturned portion of the said half first formed brazing material, such as bronze wire 3, is placed. After heating in a furnace until the brazing material flows between the contacting surfaces of the halves, the shaft is finished by cutting away with an abrasive wheel those portions of each edge which formed the pockets. It will be observed that in this manner a shaft is secured whose exterior on cross-section is practically a perfect circle with a reenforcing element 14, Fig. 7, associated with each seam and flat against the wall of the shaft.

It will also be noted that in forming these half portions of shafts, corrugations 16 may be made therein, as shown in Fig. 8.

In each figure of a cross-section of a shaft, the line $x$—$y$ indicates the plane in respect to which the shaft is in perfect balance. By affixing such a shaft to a golf club head in a position so that said plane of shaft balance is tangent, at the moment of impact between said head and a struck ball, to the curve described by the center line of the shaft as it is swung, a club is secured which will excel in performance a club which has a solid steel, seamless tube or best wood shaft.

It is this balanced relation of elements to secure balanced functioning that is the general characteristic of my invention, and I have described and claim three species of shafts in which I secure the advantages of my discovery. Also I describe and claim the methods I have devised for making the seams with stiffening elements which I use to secure the balanced rigidity and elasticity of my said shafts.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:

1. A golf club shaft comprising a plurality of narrow strips of sheet metal, each so formed that its cross section defines an arc, an inwardly turned portion along an edge of each strip adapted to engage an adjoining strip brazed seams uniting inwardly turned portions with adjacent strips forming radially inwardly extending stiffening ribs, said brazed ribs being so disposed that said shaft is symmetrical relative to at least one plane including the center line of said shaft.

2. A golf club shaft comprising a plurality of narrow strips of sheet metal, each so formed that its cross section defines an arc, inwardly turned portions along each edge of each strip, said portions along adjoining edges being brazed together in face-to-face uncrimped engagement, forming inwardly extending radial ribs, which ribs are so disposed that said shaft is symmetrical relative to at least one plane including the center line of said shaft.

3. A shaft for golf clubs comprising a plurality of narrow longitudinal parts of sheet metal, brazed seams uniting said parts into an integral shaft, and inwardly turned portions of said parts forming radially disposed stiffening members, all so disposed that the shaft is practically symmetrical relative to at least one plane containing the axis of said shaft.

4. A flexible shaft comprising a plurality of narrow strips of metal, bent transversely to form segments of a cylinder, marginal portions of said strips bent to form stiffening members extending radially inwardly, and brazed longitudinal seams uniting said strips into an integral shaft; said strips, marginal portions and brazed seams being so formed and disposed that the shaft is practically symmetrical relative to at least one plane containing the axis of said shaft.

ALLIS M. MacFARLAND.